United States Patent
Soliman et al.

(10) Patent No.: US 7,691,027 B2
(45) Date of Patent: Apr. 6, 2010

(54) IDLE SPEED CONTROL OF A HYBRID ELECTRIC VEHICLE

(75) Inventors: Ihab S. Soliman, Warren, MI (US); Andrew J. Silveri, Royal Oak, MI (US); Deepak Aswani, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 11/947,166

(22) Filed: Nov. 29, 2007

(65) Prior Publication Data
US 2009/0143188 A1 Jun. 4, 2009

(51) Int. Cl.
*B60W 10/02* (2006.01)
(52) U.S. Cl. .......................................................... 477/5
(58) Field of Classification Search ........................ 477/5
See application file for complete search history.

(56) References Cited

U.S. PATENT DOCUMENTS

| | | | |
|---|---|---|---|
| 5,909,094 A | 6/1999 | Yamada et al. | |
| 2002/0163199 A1 | 11/2002 | Ramaswamy et al. | |
| 2008/0305924 A1* | 12/2008 | Soliman et al. | 477/5 |
| 2008/0305925 A1* | 12/2008 | Soliman et al. | 477/5 |
| 2009/0042689 A1* | 2/2009 | Soliman et al. | 477/5 |
| 2009/0062061 A1* | 3/2009 | Silveri et al. | 477/5 |
| 2009/0093336 A1* | 4/2009 | Soliman et al. | 477/5 |
| 2009/0326778 A1* | 12/2009 | Soliman et al. | 701/84 |

FOREIGN PATENT DOCUMENTS

| | | |
|---|---|---|
| GB | 2391642 | 2/2004 |
| JP | 2006125218 | 5/2006 |
| JP | 2007126082 | 5/2007 |

\* cited by examiner

*Primary Examiner*—Dirk Wright
(74) *Attorney, Agent, or Firm*—David B. Kelley; MacMillan, Sobanski & Todd, LLC

(57) ABSTRACT

In a powertrain that includes wheels for driving a vehicle, a crankshaft, a machine driveably connected to the crankshaft and able to operate alternately as an electric motor and electric generator, a transmission including an input clutch driveably connected to the crankshaft and an output driveably connected to the wheels, a method for controlling idle speed including producing a desired magnitude of input clutch torque capacity, producing a desired wheel torque, using an error represented by a difference between a desired crankshaft idle speed and a current crankshaft speed to determine a desired change in torque produced by the machine, using the magnitude of input clutch torque capacity and the desired change in torque produced by the machine to determine a desired magnitude machine torque, and using the machine to produce said desired magnitude of machine torque.

13 Claims, 4 Drawing Sheets

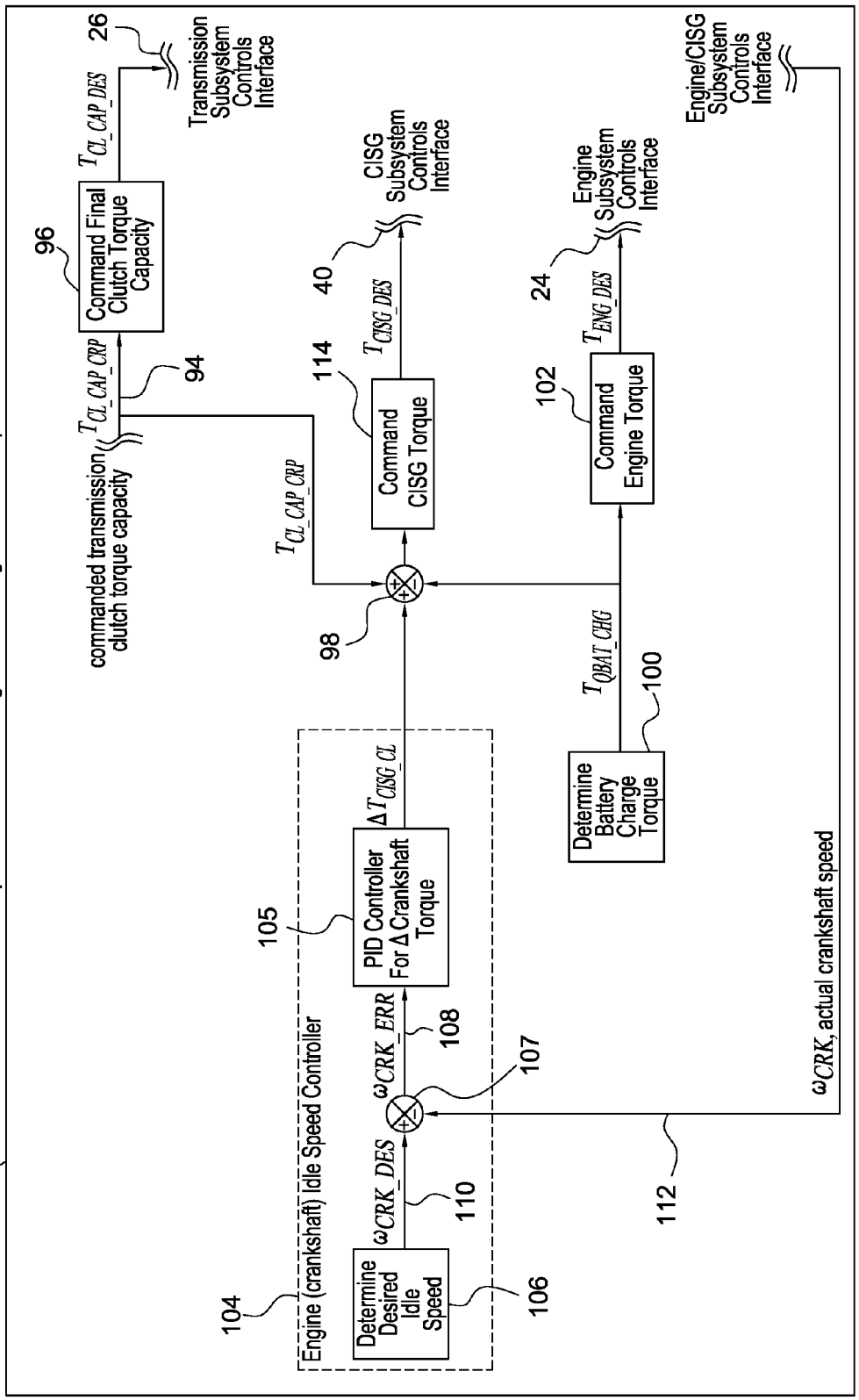

IDLE SPEED CONTROL OF A HYBRID ELECTRIC VEHICLE

BACKGROUND OF THE INVENTION

1. Field of the Invention

This invention relates generally to an apparatus and method for controlling crankshaft idle speed during a vehicle creep condition in a hybrid electric vehicle (HEV).

2. Description of the Prior Art

A powershift transmission is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle creep condition while the engine is idling in a conventional vehicle having an engine, powershift transmission, single propulsion path and single power source, the transmission clutch torque capacity is controlled by slipping the transmission input clutch as the driver releases the brake pedal. In a powershift transmission vehicle application, providing consistent, acceptable vehicle creep performance can be a difficult control problem due to the absence of a torque converter.

As the driver releases the brake pedal, the increase in clutch torque capacity loads the engine and disturbs the control of the engine idle speed. Therefore, engine idle speed control must be coordinated with any increase in the clutch torque capacity.

Unlike a conventional vehicle having a powershift transmission, a hybrid electric vehicle with a powershift transmission, multiple power sources can be used during a vehicle creep condition to provide robust, responsive engine idle speed control while accounting for the battery charging needs of the vehicle.

A need exists for responsive idle speed control that corrects for input clutch torque capacity disturbance, delayed engine torque response due to intake manifold filling as clutch torque capacity is increased, and potential engine stall if too much clutch torque capacity is provided while the engine torque has not increased sufficiently. The engine idle speed control must provide good coordination between transmission clutch torque capacity control and crankshaft speed control during a vehicle creep condition.

SUMMARY OF THE INVENTION

In a powertrain that includes wheels for driving a vehicle, an engine including a crankshaft, a machine driveably connected to the crankshaft and able to operate alternately as an electric motor and electric generator, a transmission including an input clutch driveably connected to the crankshaft and an output driveably connected to the wheels, and an electric storage battery having a variable state of charge and electrically connected to the machine, a method for controlling engine idle speed during a vehicle creep condition including producing a desired magnitude of input clutch torque capacity, producing a desired wheel torque, determining a desired battery charge torque, using the engine to produce the desired battery charge torque, using an error represented by a difference between a desired crankshaft idle speed and a current crankshaft speed to determine a desired change in torque produced by the machine, using the magnitude of input clutch torque capacity, magnitude of desired battery charge torque and the desired change in torque produced by the machine to determine a desired magnitude machine torque, and using the machine to produce said desired magnitude of machine torque.

The HEV idle speed control system provides a responsive idle speed control while accounting for battery charging needs and transmission clutch torque capacity actuation. Furthermore, by taking advantage of the crank-integrated electric machine to control the crankshaft idle speed, the control system accounts for engine manifold filling delays and transmission input clutch torque capacity actuation during vehicle creep conditions, is robust and responsive due to the short period required to produce electric machine torque, and is applicable to any HEV powertrain that includes a crankshaft-integrated electric machine and a transmission having no torque converter and either a wet or dry input clutch, i.e., a dual clutch powershift, automated manual transmission or any converterless automatic transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 3 is a schematic diagram of a crankshaft idle speed control system;

DESCRIPTION OF THE PREFERRED EMBODIMENT

Figure 1:
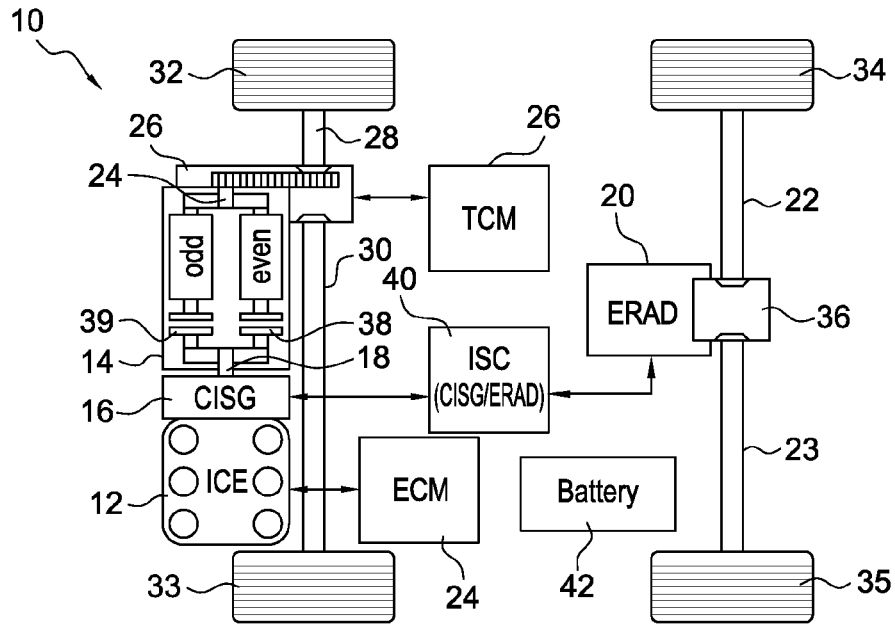
FIG. 1 is a schematic diagram showing an automotive vehicle powertrain of a hybrid electric vehicle utilizing a powershift transmission.
Figure 2:
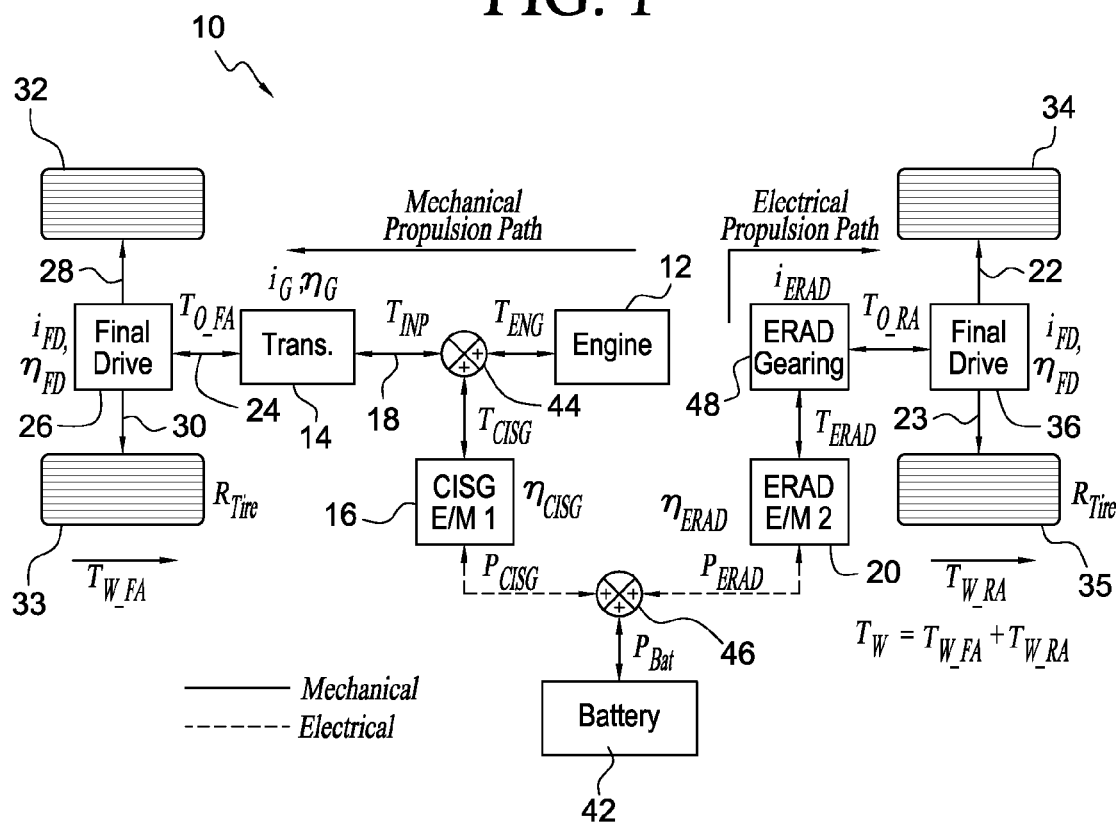
FIG. 2 is a schematic diagram showing propulsion and power flow of the vehicle powertrain of FIG. 1.

Referring first to FIGS. 1 and 2, the powertrain 10 configuration includes a first power source such as an internal combustion engine 12, a diesel engine or a gasoline engine; a power transmission 14 driveably for producing multiple forward and reverse gear ratios, such as a wet-clutch powershift transmission; an electric machine 16 driveably connected to the engine crankshaft and transmission input 18, such as a crankshaft integrated starter/generator (CISG) for providing starter/generator capability; and an additional electric machine 20 driveably connected to the rear axles 22,23, such as a electric rear axle drive (ERAD), for providing additional propulsion capability in either an electric drive or hybrid drive mode. The transmission output 24 is connected through a final drive unit and differential mechanism 26 to the front axles 28, 30, which drive the front wheels 32, 33, respectively. ERAD 20 drives the rear wheels 34, through ERAD gearing 48, a differential mechanism 36, rear axles 22, 23 and wheels 34, 35.

An electronic engine control module (ECM) 24 controls operation of engine 12. An electronic transmission control module (TCM) 26 controls operation of transmission 14 and the input clutches 38, 39. An integrated starter controller (ISC) 40 controls operation of CISG 16, ERAD 20 and the system for charging an electric storage battery 42, which is electrically coupled to the electric machines 16, 20.

FIG. 2 shows the power and energy flow paths from the power sources 12, 16, 20 to the load at the vehicle wheels 32-35. Power produced by engine 12 and power produced by CISG 16 is combined at 44 and is transmitted to the transmission input 18. Electric power produced by both electric machines 16, is combinable at 46 for charging the battery 42, or is transmitted from the battery to the electric machines. Mechanical power produced by ERAD 20 is transmitted through ERAD gearing 48 to the load at the rear wheels 34, 35 through the rear final drive 36.

In the HEV powertrain 10, power can be transmitted to the wheels 32-35 during a vehicle creep condition solely in an electric drive mode by the electric machine 20 independently of the engine 12 and transmission 14, or in a parallel drive mode by a combination of engine 12, transmission 14 and the electric machines 20, 16. Two propulsion paths, mechanical and electrical, can be used to meet a given propulsion demand request. The engine 12 and CISG 16 can provide power to the wheels by transmitting torque through the transmission 14 in the mechanical propulsion path to the front axles 28, 30, and the ERAD motor 20 can provide power directly in the electrical propulsion path to the rear axles 22, 23.

Referring now to FIG. 3, a crankshaft idle speed control system during vehicle creep for an HEV includes a controller 70, which includes an electronic microprocessor, accessible to electronic memory containing stored functions, variables, and control algorithms and electronic signals produced by various sensors representing operating parameters and variables of the vehicle, engine 12, CISG 16, ERAD 20, transmission 14, input clutches 38, 39, ERAD gearing 48 and final drive 26, front and rear differentials 26,36, such as CISG and ERAD speed and temperature sensors, a vehicle speed sensor, brake pressure sensor. The microprocessor executes the algorithms and produces control commands to which the engine 12, CISG 16 and ERAD 20 respond by producing torque, and the transmission 14 responds by engage and disengaging input clutches 38, 39 and alternately engaging a forward gear and reverse gear.

At 94, the desired torque capacity $T_{CL\_CAP\_CRP}$ of the input clutch 38, 39 that is associated with the current gear of transmission 14 during vehicle creep is determined by controller 70. At 96, a desired clutch torque capacity $T_{CL\_CAP\_DES}$ command is sent by the controller 70 to TCM 26. The torque capacity of the subject clutch is produced in response to the desired clutch torque command $T_{CL\_CAP\_DES}$, and a signal representing clutch torque capacity during vehicle creep $T_{CL\_CAP\_CRP}$ is transmitted to a summing junction 98. The subject input clutch is always slipping when vehicle creep is being controlled by controller 70.

If the SOC of battery 42 is less than a reference SOC, at 100, controller 70 determines a desired battery charge torque $T_{QBAT\_CHG}$ and, at 102, commands ECM 24 to produce the desired engine torque $T_{ENG\_DES}$, substantially equal to the engine torque required to charge the battery 42. If the SOC is greater than the reference SOC, engine torque is controlled at 102 to zero brake torque since CISG 16 will control idle speed. The signal representing the battery charge torque $T_{QBAT\_CHG}$ is a first feed-forward signal transmitted to summing junction 98.

A crankshaft idle speed closed-loop controller 104 is used to determine a desired change in CISG torque $\Delta T_{CISG\_CL}$ based on a crankshaft speed feedback error 108 represented by the difference between the desired idle speed 110, determined at 106, and the actual crankshaft speed 112, which is feedback to summing junction 107 from ECM 24. Preferably a PID closed-loop controller 105 or a comparable controller determines the desired change in CISG torque $\Delta T_{CISG\_CL}$ that is also transmitted to summing junction 98.

At summing junction 98, the desired change in torque produced by CISG 16 $\Delta T_{CISG\_CL}$, the commanded or estimated creep clutch torque capacity $T_{CL\_CAP\_CRP}$, and the battery charge torque $T_{QBAT\_CHG}$ are added algebraically. The desired change in torque $\Delta T_{CISG\_CL}$ represents a closed-loop CISG torque required to maintain idle speed control, and the sum of battery charge torque $T_{QBAT\_CHG}$ and creep clutch torque capacity $T_{CL\_CAP\_CRP}$ represent an open-loop feed-forward CISG torque, with which to maintain idle speed control. The battery charge torque $T_{QBAT\_CHG}$ is a negative value and reduces the feed-forward CISG torque since an increase in battery charge torque would cause an increase in idle speed. The creep clutch torque capacity $T_{CL\_CAP\_CRP}$ is a positive feed-forward CISG torque since an increase in clutch torque would cause a decrease in idle speed. At 114, controller 70 issues a command to ISC 40 to produce the overall desired CISG torque $T_{CISG\_DES}$ according to the output of summing junction 98 which includes both the closed-loop and feed-forward CISG torque commands.

Figure 4A:
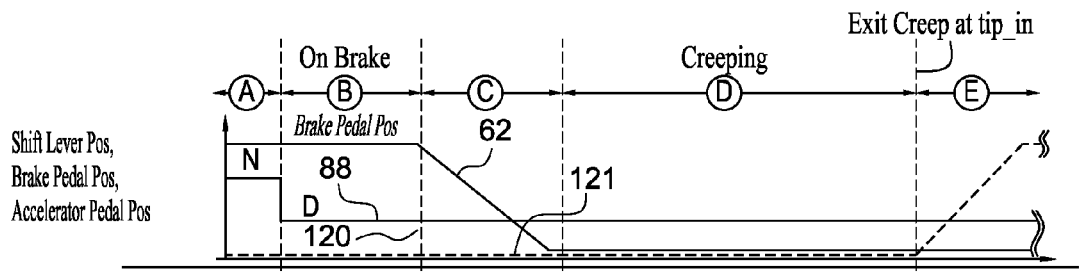
FIGS. 4A-4G are graphs of various powertrain and vehicle parameters before, during and following an idle speed condition during vehicle creep in which a CISG provides torque to control engine idle speed.

FIGS. 4A-4G are graphs of various powertrain and vehicle parameters before, during and following a vehicle creep condition in which torque blending is not used. FIG. 4A shows that the gear selector 88 may be in the N or neutral position during period A, thereafter it is moved to the D or drive position at the beginning of period B before vehicle creep control begins. The brake pedal 62 is depressed during periods A and B, and is released at the beginning of period C, where vehicle creep control begins at 120, and remains released until the beginning of period D. The accelerator pedal displacement 121 is zero throughout periods A-D and is depressed gradually during period E, which terminates the vehicle creep control.

Figure 4B:
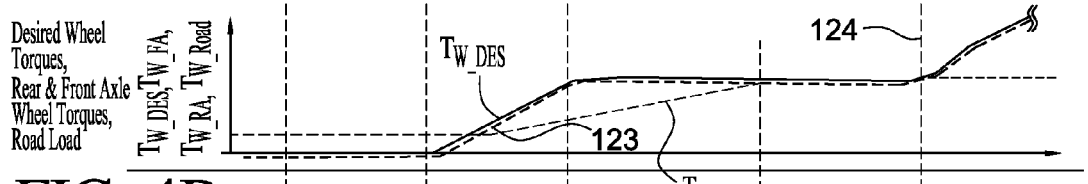

In FIG. 4B, the overall desired wheel torque $T_{W\_DES}$ 123 and desired front axle wheel torque $T_{W\_FA}$ increase at the beginning of creep control at 120 as the brake pedal is released during period C and remain constant during period D until creep control terminates at 124. The desired front axle wheel torque $T_{W\_FA}$ is equal to the overall desired wheel torque $T_{W\_DES}$ since no rear axle wheel torque $T_{W\_RA}$ is provided by the ERAD 20. During a point during period D, the vehicle reaches a steady-state creep speed once the wheel torque is equal to the road load 122.

Figure 4C:
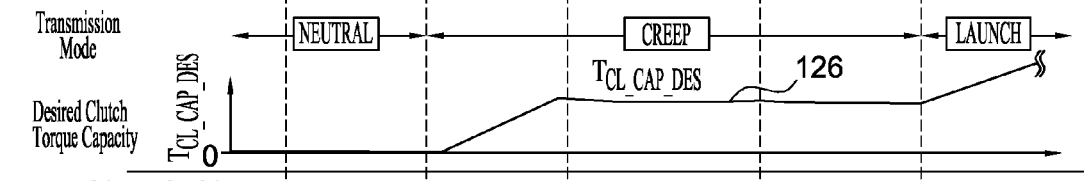

In FIG. 4C, the input clutch torque capacity is zero until it begins to ramp-up at the beginning of creep control 120 to the desired clutch torque capacity 126 since there is an increase in the desired front axle wheel torque $T_{W\_FA}$. During period D, the desired clutch torque capacity 126 remains constant since the desired front axle wheel torque $T_{W\_FA}$ is also constant until creep control terminates at 124.

Figure 4D:
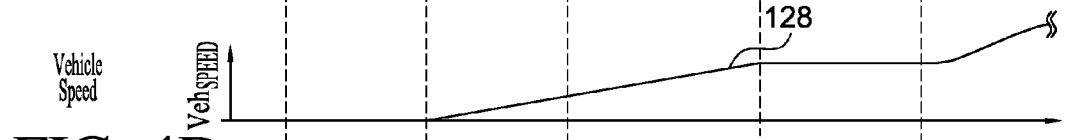

In FIG. 4D, vehicle speed is zero until it ramps-up at the beginning of creep control 120 as input clutch torque transmits the current crankshaft torque to the wheels. Crankshaft torque includes engine torque, or CISG torque or both of these. Vehicle speed reaches a controlled steady vehicle creep speed 128 once the wheel torque equals the road load 122, which remains constant until creep control terminates at 124.

Figure 4E:
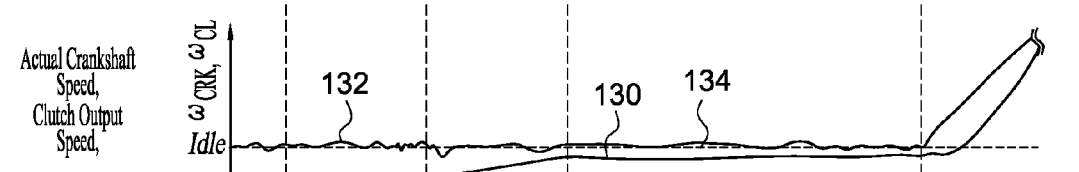

In FIG. 4E, the speed 130 at the gear box, i.e., clutch output, side of the input clutch 38, 39 is zero until it ramps-up at the beginning of creep control 120 as the input clutch gains torque capacity. Clutch speed 130 is smaller than the crankshaft idle speed and remains constant until creep control terminates at 124. The speed 132 of crankshaft 18 is controlled to a constant desired crankshaft idle speed 134 until creep control terminates at 124.

Figure 4F:
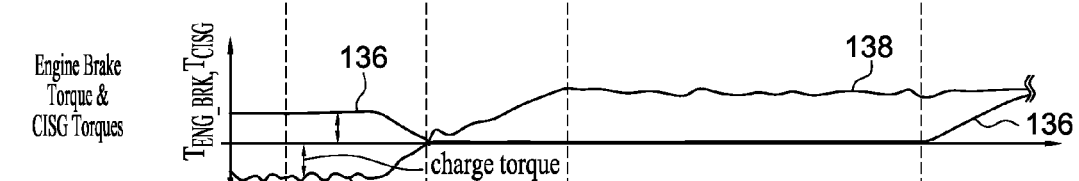

In FIG. 4F, engine brake torque 136 is positive and constant while battery 42 is being charged to the reference SOC required to supply electric energy to the CISG 16. Engine brake torque 136 decreases following the battery charge and remains constant until creep control terminates at 124 unless the battery SOC falls below the reference SOC. CISG torque 138 is negative during the battery charging period A & B, ramps-up to a positive torque when vehicle creep control begins at 120 due to the increase in clutch torque capacity. During period D, it remains constant and positive until creep control terminates at 124.

Figure 4G:
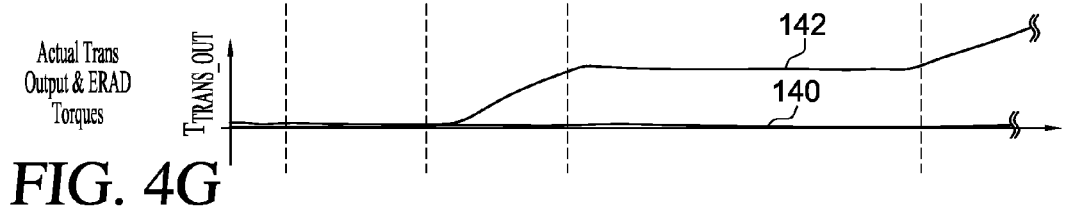

In FIG. 4G, torque 140 produced by ERAD 20 is zero since only front axle wheel torque $T_{W\_FA}$, is desired. The transmission output torque 142 is zero until it ramps-up at the beginning of creep control 120 as the input clutch 38, 39 gains torque capacity, and remains constant during period D until creep control terminates at 124.

The HEV idle speed control system provides a responsive idle speed control during vehicle creep conditions while accounting for battery charging needs and transmission clutch torque capacity disturbances. By taking advantage of the responsiveness of a crank-integrated electric machine to control the crankshaft idle speed and by directly accounting for clutch torque loading during vehicle creep, engine manifold filling delays are avoided and robust idle speed control is provided.

Figure 5:
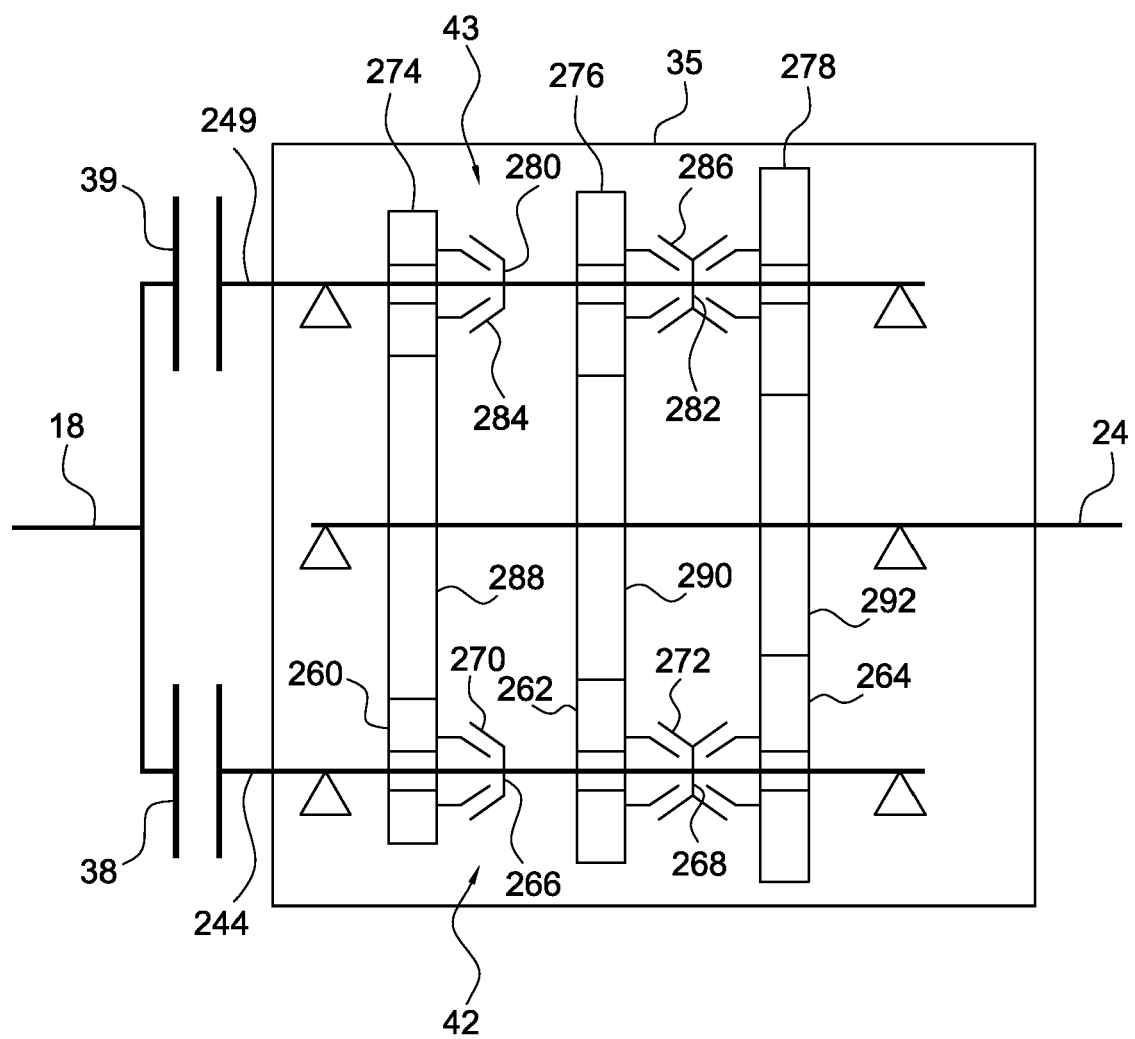
FIG. 5 is a schematic diagram showing details of a powershift transmission.

FIG. 5 illustrates details of a powershift transmission 14 that includes the first input clutch 38, which selective connects the input 18 of the transmission alternately to the even-numbered gears 42 associated with a first layshaft 244, and a second input clutch 241, which selective connects the input 20 alternately to the odd-numbered gears 243 associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 24 supports gears 288, 290, 292, which are each secured to output shaft 24. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these.

In accordance with the provisions of the patent statutes, the preferred embodiment has been described. However, it should be noted that the alternate embodiments can be practiced otherwise than as specifically illustrated and described.

What is claimed is:

1. In a powertrain that includes wheels for driving a vehicle, an engine including a crankshaft, a machine driveably connected to the crankshaft and able to operate alternately as an electric motor and electric generator, a transmission including an input clutch driveably connected to the crankshaft and an output driveably connected to the wheels, a method for controlling idle speed, comprising the steps of:
    (a) producing a desired magnitude of input clutch torque capacity;
    (b) producing a desired wheel torque by transmitting torque produced by the engine and machine through the input clutch and transmission to the wheels;
    (c) using an error represented by a difference between a desired crankshaft idle speed and a current crankshaft speed to determine a desired change in torque produced by the machine;
    (d) using the magnitude of input clutch torque capacity and the desired change in torque produced by the machine to determine a desired magnitude of machine torque; and
    (e) using the machine to produce said desired magnitude of machine torque.

2. The method of claim 1 wherein the powertrain includes an electric storage battery electrically connected to the machine, the method further including the step of using the battery to supply electric energy to the machine.

3. The method of claim 1 wherein step (c) further includes:
    determining a desired crankshaft idle speed;
    determining an idle speed error from a difference between a current crankshaft idle speed and the desired crankshaft idle speed; and
    determining the desired change in torque produced by the machine such that the idle speed error is minimized.

4. The method of claim 1 wherein the powertrain includes an electric storage battery electrically connected to the machine and having a variable state of charge, and step (d) further includes the steps of:
    determining whether the state of charge is low relative to a reference state of charge;
    if the state of charge is less than the reference state of charge, determining a desired magnitude of engine torque required to charge the battery;
    using the engine to produce said desired magnitude of engine torque;
    using the magnitude of input clutch torque capacity, the desired change in torque produced by the machine, and the desired magnitude of engine torque required to charge the battery to determine a desired magnitude of machine torque; and
    using the machine to produce said desired magnitude of machine torque.

5. The method of claim 1 wherein step (a) further includes the step of producing a speed ratio produced by the transmission.

6. The method of claim 1, wherein the powertrain further includes an engine driveably connected to the crankshaft, and the method further includes the steps of operating the engine to produce zero brake torque.

7. The method of claim 1 wherein the powertrain includes an electric storage battery electrically connected to the machine, the method further including the step of using the battery to supply electric energy to the machine and store electric energy produced by the machine, and step (d) further includes commanding the engine torque to achieve a desired battery state of charge.

8. A system for controlling a powertrain during a vehicle creep condition comprising:
    wheels for driving the vehicle;
    a crankshaft;
    a machine driveably connected to the crankshaft and able to operate alternately as an electric motor and an electric generator;
    a transmission including an input clutch driveably connected to the crankshaft, and an output driveably connected to the wheels; and
    a controller configured to produce a desired magnitude of input clutch torque capacity, to produce a desired wheel torque, to use an error represented by a difference between a desired crankshaft idle speed and a current crankshaft speed to determine a desired change in torque produced by the machine, to use the magnitude of input clutch torque capacity and the desired change in torque produced by the machine to determine a desired magnitude machine torque, and to use the machine to produce said desired magnitude of machine torque.

9. The system of claim 8 further comprising:
    an electric storage battery having a variable state of charge and electrically connected to the machine; and
    wherein the controller is further configured to use the battery to supply electric power to the machine.

10. The system of claim 8 further comprising:
    an engine driveably connected to the crankshaft; and
    wherein the controller is further configured to control the engine to produce zero brake torque.

11. The system of claim 8 wherein the controller is further configured to determine a desired crankshaft idle speed, to determine an idle speed error from a difference between a current crankshaft idle speed and the desired crankshaft idle speed, and to determine the desired change in torque produced by the machine such that the idle speed error is minimized.

12. The system of claim 8 further comprising:
    an electric storage battery having a variable state of charge and electrically connected to the machine; and
    wherein the controller is further configured to determine whether the state of charge is low relative to a reference state of charge; to determine a magnitude of engine torque required to charge the battery, if the state of charge is less than the reference state of charge; to use the magnitude of input clutch torque capacity, the desired change in torque produced by the machine, and a magnitude of machine torque required to charge the battery to determine a desired magnitude machine torque; and to use the machine to produce the desired magnitude of machine torque.

13. The system of claim 7 further comprising:
    an electric storage battery having a variable state of charge and electrically connected to the machine; and
    wherein the controller is further configured to determine whether the state of charge is low relative to a reference state of charge; determine a magnitude of machine torque required to charge the battery, if the state of charge is less than the reference state of charge; to use the magnitude of input clutch torque capacity, the desired change in torque produced by the machine, and a magnitude of machine torque required to charge the battery to determine a desired magnitude machine torque; and to use the machine to produce the desired magnitude of machine torque.

* * * * *